(No Model.)

C. H. SHAW.
FAUCET BUSHING.

No. 270,559. Patented Jan. 9, 1883.

Witnesses,
E. F. Benham,
Chas. F. Scattergood,

Inventor,
Charles H. Shaw,
~by~
William N. Low,
Attorney.

UNITED STATES PATENT OFFICE.

CHARLES H. SHAW, OF TROY, NEW YORK, ASSIGNOR OF ONE-HALF TO JOHN H. REYNOLDS, OF SAME PLACE.

FAUCET-BUSHING.

SPECIFICATION forming part of Letters Patent No. 270,559, dated January 9, 1883.

Application filed December 31, 1880. (No model.)

*To all whom it may concern:*

Be it known that I, CHARLES H. SHAW, of Troy, in the county of Rensselaer and State of New York, have invented certain Improvements in Faucet-Bushings for Barrel-Heads, &c., of which the following is a specification.

The object of my invention is to provide an expansible packing for forming a tight joint between the conical pipe of a faucet and the edge of the hole in a barrel, keg, or other vessel. This object I attain by means of the device illustrated in the accompanying drawings, in which—

Figure 1:
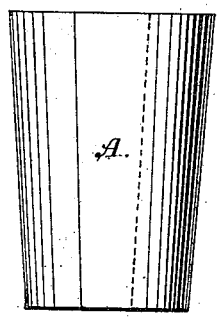
Figure 3:
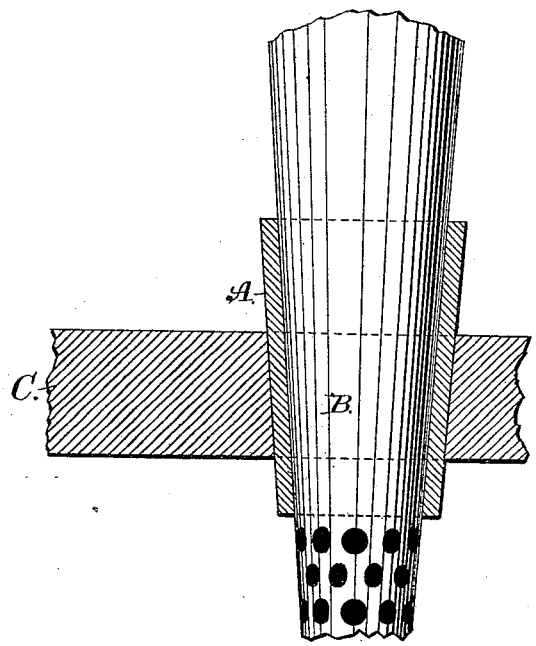
Figure 2:
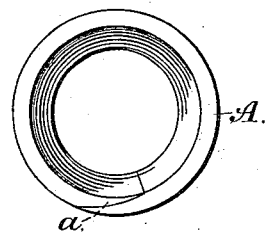

Figure 1 is a side elevation of the bushing; Fig. 2, a plan view of same, and Fig. 3 a vertical section of the bushing applied to the pipe of a faucet fixed in the head of a barrel.

As represented in the drawings, the bushing A consists of an imperforate conical tube, made of paper, pasteboard, or other material that possesses sufficient rigidity to maintain its molded form, combined with the requisite degree of compressibility to permit it to yield to any slight inequality between the form of the perimeter of the pipe of the faucet and the hole in the barrel. The said bushing is provided with a separable longitudinal joint, *a*, that is made by chamfering in opposite directions the two conjoining edges of the piece of which the tube is formed, so as to produce a "scarf-joint," as shown in Fig. 2. The two faces of the joint are not adhered, and the tube is thus left in condition to expand when an internal pressure is produced by driving the pipe of the faucet into it.

When applied to use, the bushing A is first placed on the pipe B of a faucet, and near the lower end thereof. The faucet is then inserted in the hole in the head C of a barrel intended for its reception, and the bushing is held snugly around the pipe of the faucet while the two are being inserted in the hole and until the bushing is prevented from penetrating farther by reason of the resistance offered by the grain of the wood. The faucet is then driven in with such force that the bushing will be distended in diameter and compressed in thickness to fill the space between the pipe of the faucet and the bore of the hole in the barrel.

This bushing is especially intended for use in kegs and barrels from which the faucet is frequently removed. Such removals, from the blows given to the opposite sides of the faucet, soon cause the hole in the barrel to become more out of shape, so that the faucet will not fill it, and a leakage occurs at that point. This trouble is remedied by the use of my bushing, which freely expands, by reason of its separable longitudinal joint, to suit the taper of the pipe, and which is sufficiently compressible in its thickness to accommodate any usual inequality in the space between the pipe of the faucet and the bore of the hole in the barrel. The chamfered edges of my bushing fit together as it expands and contracts, leaving no interval and requiring no additional piece nor external rib to close the joint. I do not broadly claim a split compressible bushing adapted to be applied between a faucet and the sides of the hole into which it is driven; but What I do claim is—

The compressible faucet-bushing A, having an oblique longitudinal joint, the chamfered edges fitting together and leaving no opening as said bushing expands or contracts.

CHARLES H. SHAW.

Witnesses:
JAS. C. DE LA MARE,
J. G. FULLER.